US 6,637,552 B1

(12) United States Patent
Peterson

(10) Patent No.: US 6,637,552 B1
(45) Date of Patent: Oct. 28, 2003

(54) INFLATABLE VEHICLE BRAKING SYSTEM

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/255,546

(22) Filed: Sep. 26, 2002

(51) Int. Cl.$^7$ .............................................. B62B 17/08
(52) U.S. Cl. ............................. 188/8; 188/6; 280/28.11
(58) Field of Search ................................ 188/5, 6, 7, 8, 188/32; 280/845, 16, 17, 18, 21.1, 28.11

(56) References Cited

U.S. PATENT DOCUMENTS

| | | | | |
|---|---|---|---|---|
| 2,134,587 A | * | 10/1938 | Simmons | 188/8 |
| 2,664,174 A | * | 12/1953 | Marr | 188/8 |
| 3,455,571 A | * | 7/1969 | Dallera et al. | 280/18 |
| 3,948,536 A | * | 4/1976 | Konrad | 280/18 |
| 4,219,207 A | * | 8/1980 | Muir et al. | 280/22.1 |
| 4,311,215 A | * | 1/1982 | Becker et al. | 188/8 |
| D301,568 S | * | 6/1989 | Kuan | D12/11 |
| D389,781 S | * | 1/1998 | Peterson | D12/11 |
| D419,918 S | * | 2/2000 | Haley et al. | D12/11 |
| 2003/0020248 A1 | * | 1/2003 | Oberpriller | 280/21.1 |

* cited by examiner

Primary Examiner—Christopher P. Schwartz
Assistant Examiner—Devon Kramer
(74) Attorney, Agent, or Firm—Sturm & Fix LLP

(57) ABSTRACT

A braking system for an inflatable vehicle, including a rigid housing attached to the deck of the vehicle and a braking lever pivotally attached to the housing. The lever is frictionally held in an inactivated position where the drag arm forming the lower portion of the lever is positioned above the lower panel of the deck. When the hand grip that forms the upper portion of the lever is pulled up, it overcomes the frictional force and moves the drag arm down below the lower panel of the deck to provide a braking force. In one embodiment, the brake system housing is matingly received and frictionally secured in an open cavity extending between the top and bottom panels of the deck. In another embodiment, the top and bottom panels of the deck are sealingly attached to the housing. A pair of housings with associated braking levers may be transversely spaced on the deck to provide braking and selective steering of the inflatable vehicle.

6 Claims, 1 Drawing Sheet

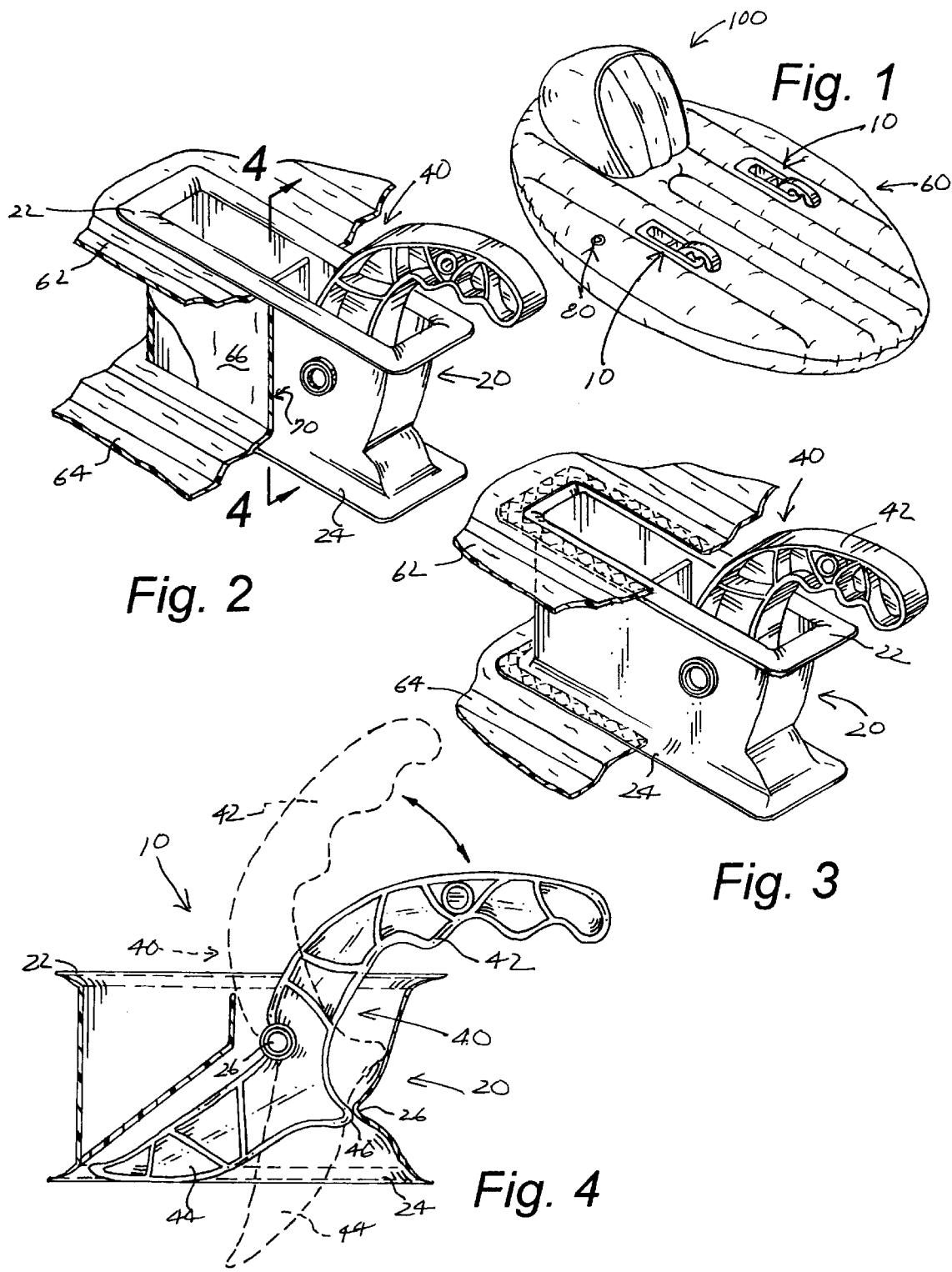

INFLATABLE VEHICLE BRAKING SYSTEM

BACKGROUND OF THE INVENTION

1. Field of the Invention

The present invention relates to the field of braking systems, and more particularly to a braking system for an inflatable vehicle.

2. Description of Related Art

Inflatable snow vehicles currently available are designed to be towed behind a powered vehicle such as a snowmobile, and to simply coast down a snow-covered incline by the force of gravity. None of these vehicles, however, employ a braking system for reducing the speed of the vehicle, or alternatively, to selectively steer the vehicle by applying a braking force to one side or the other of the vehicle.

As a consequence of the foregoing situation, there has existed a longstanding need for a braking system for an inflatable vehicle, and the provision of such a device is a stated objective of the present invention.

BRIEF SUMMARY OF THE INVENTION

Briefly stated, a braking system for an inflatable vehicle, including a rigid housing attached to the deck of the vehicle and a braking lever pivotally attached to the housing. The lever is frictionally held in an inactivated position where the drag arm forming the lower portion of the lever is positioned above the lower panel of the deck. When the hand grip that forms the upper portion of the lever is pulled up, it overcomes the frictional force and moves the drag arm down below the lower panel of the deck to provide a braking force. In one embodiment, the brake system housing is matingly received and frictionally secured in an open cavity extending between the top and bottom panels of the deck. In another embodiment, the top and bottom panels of the deck are sealingly attached to the housing. A pair of housings with associated braking levers may be transversely spaced on the deck to provide braking and selective steering of the inflatable vehicle.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of an inflatable snow vehicle employing the braking system of the present invention;

FIG. 2 is an enlarged cut away perspective view of the braking system installed in a sealed cavity of the inflatable deck of a snow vehicle;

FIG. 3 is an enlarged cut away perspective view of an alternate embodiment wherein the braking system is installed between the top and bottom panels of the inflatable deck of a snow vehicle; and FIG. 4 is a sectional view taken along line 4—4 of FIG. 2 with a broken line illustrating the braking lever moved to the activated position.

DETAILED DESCRIPTION OF THE INVENTION

As can be seen by reference to the drawings, and in particular to FIG. 1, the braking system that forms the basis of the present invention is designated generally by the reference number 10. The braking system 10, as illustrated in FIG. 1, includes a pair of rigid housings 20 and associated braking levers 40 transversely spaced on the deck 60 of an inflatable vehicle 100. As best shown in FIGS. 2 and 3, the deck 60 is formed of PVC or other suitable material and has a top panel 62 and bottom panel 64.

In the FIG. 2 embodiment, the housing 20 is matingly received and frictionally secured in an open cavity 70 formed by a web 66 of PVC extending between the top and bottom panels 62 and 64. The housing 20 is positioned in the cavity 70 when the deck 60 is partially inflated through valve 80. When the deck 60 is fully inflated, the housing 20 is frictionally secured in the cavity 70 with top and bottom flanges 22 and 24 of the housing engaging the top and bottom panels 62 and 64 as illustrated.

In the FIG. 3 embodiment, the top flange 22 of the housing 20 is sealingly attached to the top panel 62 of the deck 60, and the bottom flange 24 is sealingly attached to the bottom panel 64 such that the housing 20 itself forms part of the air chamber that is inflated.

As best shown in FIG. 4, the braking lever 40 has an upper portion forming a hand grip 42 and a lower portion forming a drag arm 44.

The lever 40 is pivotally attached to the housing 20 by pin 26 and is selectively movable between the inactivated position shown in full line and the braking position shown in dashed line. In the inactivated position, the drag arm 44 is above the bottom flange 24 of the housing 20 and therefore above the bottom panel 64 of the deck 60. The lever 40 is held in this inactivated position by frictional engagement of a spur 46 on the lever 40 with an indentation 26 in the housing 20. Upward force applied to the hand grip 42 overcomes this frictional engagement and moves the lever 40 to the braking position as shown in dashed line where the drag arm extends below the bottom panel 64 of the deck to provide a braking force that slows the vehicle 100. When a pair of transversely spaced housings 20 with associated levers 40 are provided as illustrated in FIG. 1, uneven application of braking force can be used to selectively steer the vehicle 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A braking system for an inflatable vehicle, comprising:
   an inflatable deck having a top panel, and a bottom panel spaced from the top panel;
   a rigid housing attached to the deck and being disposed between the top panel and the bottom panel rigid housing includes outwardly extending top and bottom flanges;
   a braking lever pivotally attached to the housing and including an upper portion forming a hand grip, and a lower portion forming a drag arm, the braking lever being selectively movable between an inactivated position where the drag arm is above the bottom panel of the deck, and a braking position where the drag arm extends below the bottom panel of the deck and the braking lever frictionally engaging the housing when the lever is in the inactivated position.

2. The braking system of claim 1 wherein the top panel of the inflatable deck is sealingly attached to the top flange of the housing and the bottom panel of the inflatable deck is sealingly attached to the bottom flange of the housing.

3. The braking system of claim 1 wherein the inflatable deck includes an open cavity that extends between the top and bottom panels, and wherein the housing is matingly received in and frictionally held in the cavity such that the top flange of the housing engages an upper surface of the top panel and the bottom flange of the housing engages a lower surface of the bottom panel.

4. The braking system of claim 1 wherein the top panel of the inflatable deck is sealingly attached to the top flange of the housing and the bottom panel of the inflatable deck is sealingly attached to the bottom flange of the housing.

5. The braking system of claim 1 wherein the inflatable deck includes an open cavity that extends between the top and bottom panels, and wherein the housing is matingly received in and frictionally held in the cavity such that the top flange of the housing engages an upper surface of the top panel and the bottom flange of the housing engages a lower surface of the bottom panel.

6. The braking system of claim 1 including a pair of the rigid housings each having the pivotally attached braking lever, the pair of housing being transversely spaced on the inflatable deck.

* * * * *